United States Patent
Gu et al.

(10) Patent No.: US 7,264,269 B2
(45) Date of Patent: Sep. 4, 2007

(54) HEAD-PROTECTING AIRBAG AND HEAD-PROTECTING AIRBAG DEVICE

(75) Inventors: Weixin Gu, Shiga (JP); Katsushi Yoshii, Yokaichi (JP)

(73) Assignee: Takata Corporation, Tokyo (JP)

( * ) Notice: Subject to any disclaimer, the term of this patent is extended or adjusted under 35 U.S.C. 154(b) by 300 days.

(21) Appl. No.: 10/706,917

(22) Filed: Nov. 14, 2003

(65) Prior Publication Data

US 2004/0119270 A1 Jun. 24, 2004

(30) Foreign Application Priority Data

Dec. 18, 2002 (JP) ............................. 2002-366958
Sep. 25, 2003 (JP) ............................. 2003-333345

(51) Int. Cl.
*B60R 21/16* (2006.01)

(52) U.S. Cl. ..................................... 280/730.2; 280/729

(58) Field of Classification Search ............. 280/730.2, 280/729, 743.1
See application file for complete search history.

(56) References Cited

U.S. PATENT DOCUMENTS

| | | | | |
|---|---|---|---|---|
| 619,267 | A * | 2/1899 | Batchelder | 493/75 |
| 4,043,572 | A * | 8/1977 | Hattori et al. | 280/738 |
| 5,240,283 | A * | 8/1993 | Kishi et al. | 280/729 |
| 5,464,250 | A * | 11/1995 | Sato | 280/743.1 |
| 5,529,337 | A * | 6/1996 | Takeda et al. | 280/729 |
| 5,713,598 | A * | 2/1998 | Morita et al. | 280/743.1 |
| 5,791,685 | A * | 8/1998 | Lachat et al. | 280/743.1 |
| 5,853,191 | A * | 12/1998 | Lachat | 280/730.2 |
| 6,059,311 | A * | 5/2000 | Wipasuramonton et al. | 280/729 |
| 6,059,312 | A * | 5/2000 | Staub et al. | 280/729 |
| 6,065,772 | A * | 5/2000 | Yamamoto et al. | 280/730.2 |
| 6,086,092 | A * | 7/2000 | Hill | 280/729 |
| 6,279,944 | B1 * | 8/2001 | Wipasuramonton et al. | 280/730.2 |
| 6,364,348 | B1 * | 4/2002 | Jang et al. | 280/730.2 |
| 6,364,350 | B2 * | 4/2002 | Hoagland | 280/730.2 |
| 6,398,253 | B1 * | 6/2002 | Heigl | 280/730.2 |
| 6,419,267 | B1 * | 7/2002 | Hashimoto et al. | 280/743.1 |
| 6,450,529 | B1 * | 9/2002 | Kalandek et al. | 280/730.2 |
| 6,464,249 | B1 * | 10/2002 | Lacroix | 280/729 |
| 6,471,244 | B1 * | 10/2002 | Nishijima et al. | 280/742 |
| 6,962,363 | B2 * | 11/2005 | Wang et al. | 280/729 |
| 2001/0026062 | A1 * | 10/2001 | Kosugi et al. | 280/730.2 |

(Continued)

FOREIGN PATENT DOCUMENTS

JP 2001-246999 A 9/2001

(Continued)

*Primary Examiner*—Paul N. Dickson
*Assistant Examiner*—Barry Gooden, Jr.
(74) *Attorney, Agent, or Firm*—Foley and Lardner LLP

(57) ABSTRACT

A head-protecting airbag and a head-protecting airbag device that exhibit a gentle change in internal pressure of chambers and facilitate the adjustment of the internal pressure of a primary chamber. In the event of a side impact or rollover of a vehicle, a gas generator is activated to supply gas into a primary chamber cell group between an air-permeable panel and a first panel of an airbag, which is thus inflated. The airbag expands downward like a curtain and inflates between vehicle occupants and an in-vehicle lateral surface. If the cushion cells, upon receiving the head of an occupant, exhibit an internal pressure higher than a predetermined value, gas flows into a secondary chamber through the air-permeable panel.

16 Claims, 4 Drawing Sheets

U.S. PATENT DOCUMENTS

| | | | |
|---|---|---|---|
| 2001/0033072 A1* | 10/2001 | Kumagai et al. | 280/730.1 |
| 2001/0042974 A1* | 11/2001 | Sasaki et al. | 280/728.2 |
| 2003/0034637 A1* | 2/2003 | Wang et al. | 280/729 |
| 2003/0107205 A1* | 6/2003 | Gu | 280/729 |
| 2003/0178831 A1* | 9/2003 | Roberts et al. | 280/743.1 |
| 2004/0119269 A1* | 6/2004 | Yokota et al. | 280/730.2 |
| 2004/0145162 A1* | 7/2004 | Abe et al. | 280/729 |

FOREIGN PATENT DOCUMENTS

| | | |
|---|---|---|
| JP | 2001-328503 A | 11/2001 |

\* cited by examiner

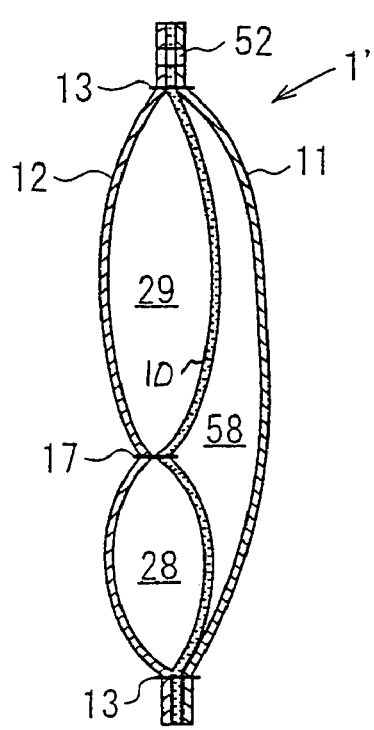
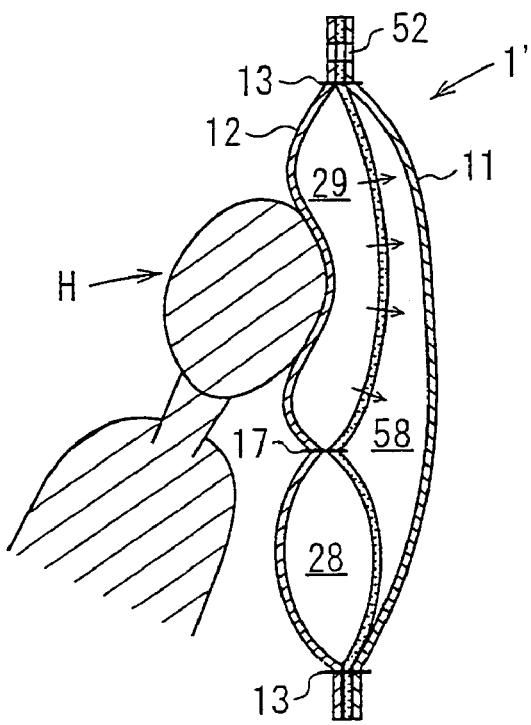
Figure 4(a)
Figure 4(b)
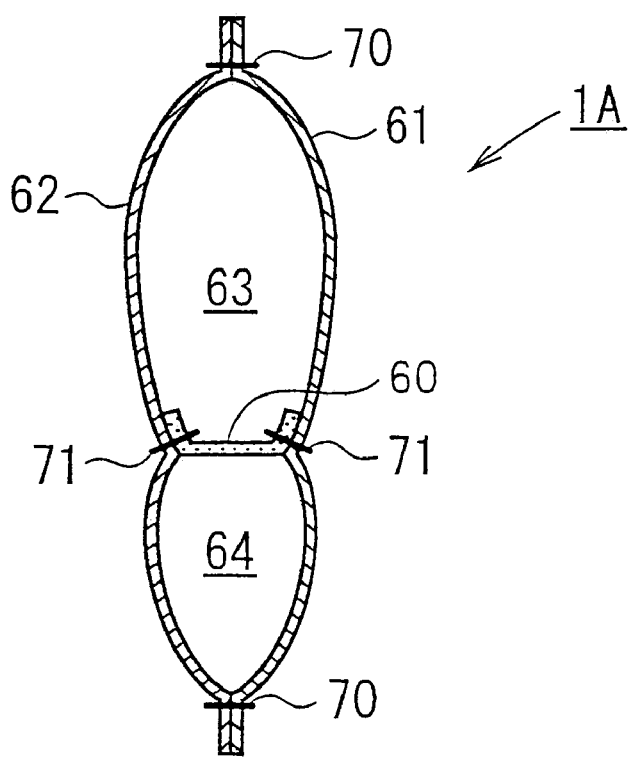
Figure 5

HEAD-PROTECTING AIRBAG AND HEAD-PROTECTING AIRBAG DEVICE

BACKGROUND

The present invention relates to an airbag for protecting the head of an occupant, and particularly to a head-protecting airbag which inflates over the side window of a side door inside a vehicle in the event of rollover or a side impact. The present invention also relates to a head-protecting airbag device including such a head-protecting airbag.

Airbags for protecting the heads of vehicle occupants are installed near the corners between the roof and the lateral surfaces inside the vehicle. These airbags are inflated over the window of a side door by gas introduced through a gas inlet.

Japanese Unexamined Patent Application Publication No. 2001-328503 (incorporated by reference herein) discloses an airbag having a primary chamber and a secondary chamber. In the airbag according to this Japanese Unexamined Patent, gas discharged from a gas generator is introduced into the primary chamber. When the internal pressure of the primary chamber reaches a predetermined value, a tear seam breaks to transfer the gas from the primary chamber into the secondary chamber.

As shown in FIG. 7 of Japanese Unexamined Patent Application Publication No. 2001-328503, the internal pressure of the chambers changes suddenly when the tear seam breaks.

Accordingly, there remains a need for a head-protecting airbag and a head-protecting airbag device that exhibit a gentle change in internal pressure of the chambers and facilitate the adjustment of the internal pressure of the primary chamber.

SUMMARY OF THE INVENTION

According to an embodiment of the present invention, an airbag for protecting the head of an occupant in a vehicle is provided. The head-protecting airbag is inflatable over an in-vehicle lateral surface. The head-protecting airbag includes at least one primary chamber which is inflated by gas discharged from a gas generator and a secondary chamber which is inflated by gas transferred from the primary chamber. The primary chamber is separated from the secondary chamber by an air-permeable panel, through which gas in the primary chamber is introduced to the secondary chamber, thereby inflating the secondary chamber.

According to another embodiment of the present invention, a head-protecting airbag device is provided. The head-protecting airbag device includes a head-protecting airbag as described above and gas generating means for generating gas to inflate the head-protecting airbag.

The head-protecting airbag described above inflates as follows. The primary chamber inflates and then gas passing through the air-permeable panel flows into the secondary chamber, which is thus inflated. The internal pressure of the chambers changes gently, since the secondary chamber is inflated by gas which has passed through the air-permeable panel. Furthermore, the internal pressure of the primary chamber can easily be adjusted by selecting the air permeability of the air-permeable panel.

An airbag according to one embodiment of the present invention includes a first panel, a second panel, and the foregoing air-permeable panel disposed between the first panel and the second panel. Between the first panel and the air-permeable panel is formed at least one primary chamber. Between the second panel and the air-permeable panel is formed a secondary chamber. According to this aspect, the airbag abruptly inflates over an in-vehicle lateral surface with a lower thickness during inflation, followed by the inflation of the secondary chamber.

In this structure, at least one portion, but other than the periphery, of the air-permeable panel may be connected to the first panel. This limits the inflation thickness of the primary chamber.

An airbag according to another embodiment of the present invention includes a first panel adjacent to the vehicle body, a second panel adjacent to an occupant, and the foregoing air-permeable panel that connects the first panel to the second panel. The airbag has a primary chamber above the air-permeable panel and a secondary chamber below the air-permeable panel. In this airbag having the above-described structure, the air-permeable panel restrains the protrusion of the second panel, thereby limiting the thickness of the airbag during inflation.

As described above, the present invention provides a head-protecting airbag and a head-protecting airbag device that exhibit a gentle change in internal pressure of chambers and facilitate the adjustment of the internal pressure of a primary chamber.

It is to be understood that both the foregoing general description and the following detailed description are exemplary and explanatory only and are not restrictive of the invention claimed.

BRIEF DESCRIPTION OF THE DRAWINGS

FIG. 4(a) is a cross sectional view of a head-protecting airbag according to an embodiment of the present invention.

FIG. 4(b) is a cross sectional view of the head-protecting airbag of FIG. 4(a) showing the airbag supporting the head of an occupant.

FIG. 5 is a cross sectional view of a head-protecting airbag according to an embodiment of the present invention.

DETAILED DESCRIPTION

Embodiments according to the present invention will be described with reference to the attached drawings. In the description below, the longitudinal direction is identical to that of a vehicle in which the head-protecting airbag is mounted, and the vertical direction is identical to that of the head-protecting airbag in an expanded state inside the vehicle.

Figure 1:
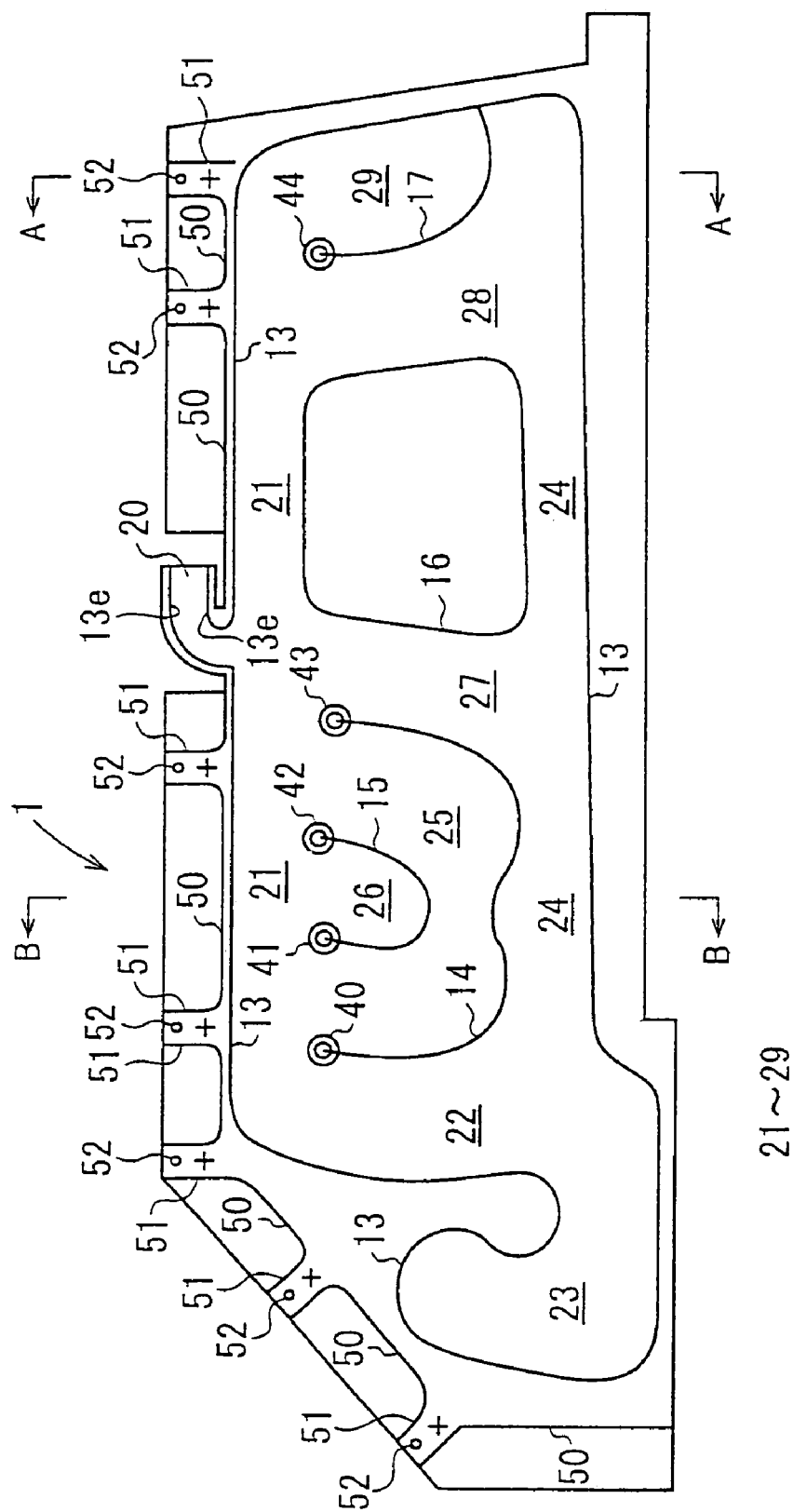
FIG. 1 is a front view of a head-protecting airbag according to an embodiment of the present invention.
Figure 2A:
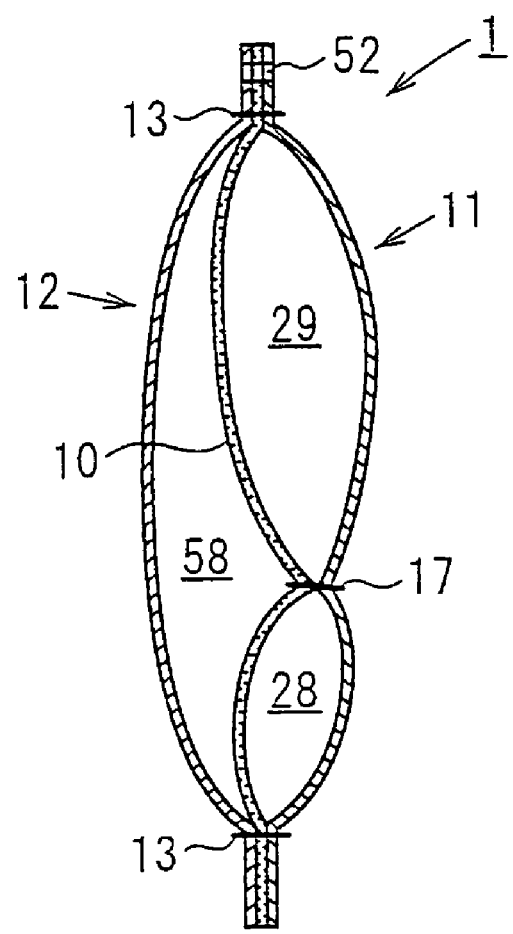
FIG. 2(a) is a cross sectional view of the head-protecting airbag taken along line A-A in FIG. 1.
Figure 2B:
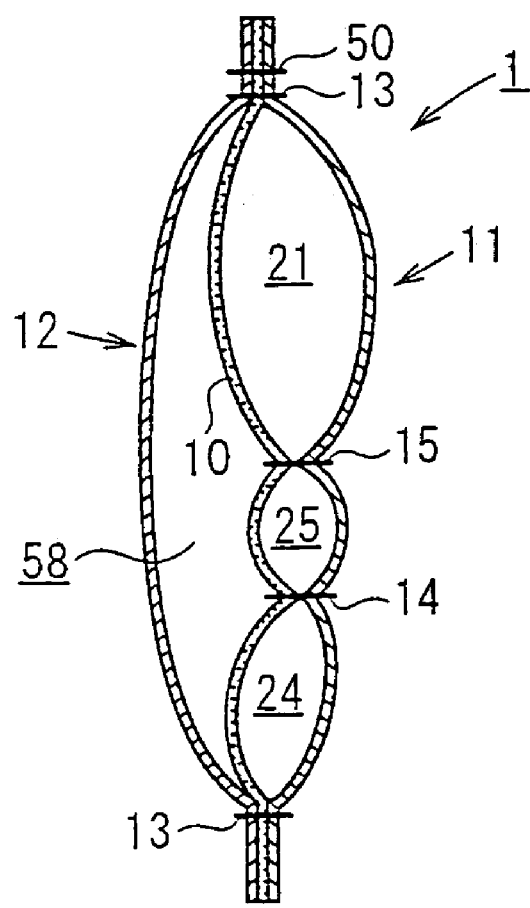
FIG. 2(b) is a cross sectional view of the head-protecting airbag taken along line B-B in FIG. 1.
Figure 3:
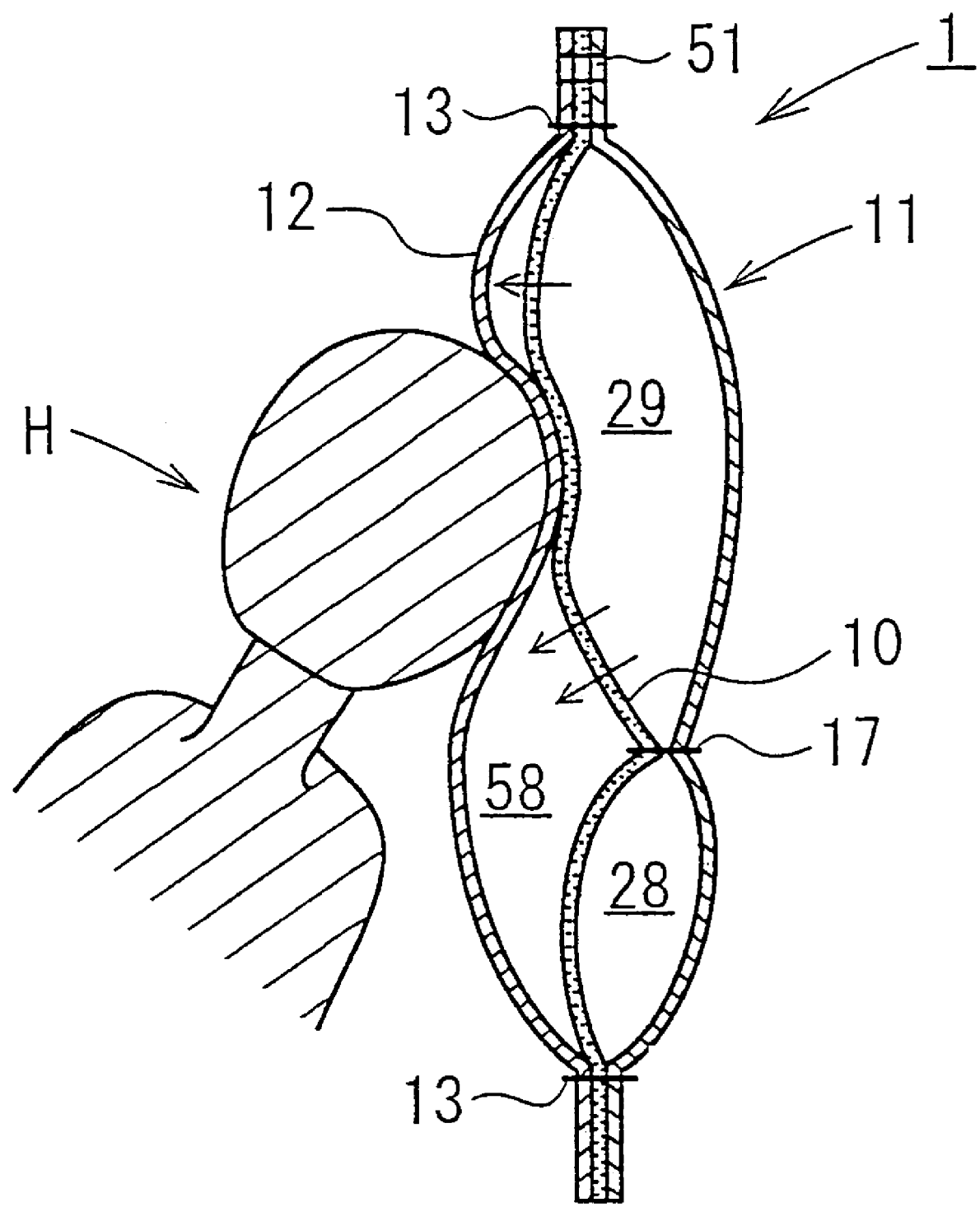
FIG. 3 is a cross sectional view of the head-protecting airbag in FIGS. 1 and 2 showing the airbag supporting the head of an occupant.

FIG. 1 is a front view of a head-protecting airbag according to an embodiment of the present invention. FIGS. 2(a) and 2(b) are sectional views taken along lines A-A and B-B, respectively, in FIG. 1. FIG. 3 is a sectional view of the head-protecting airbag in typical operation when it receives a load.

The head-protecting airbag 1 (may be referred to as the airbag hereinafter) extends along a lateral edge of the roof of a vehicle from the A pillar to the C pillar. In the event of a side impact or rollover of the vehicle, the airbag 1 inflates to expand over an in-vehicle lateral surface like a curtain, thus receiving the heads of occupants in the front seat and the rear seat. Consequently, the airbag 1 prevents the heads of the occupants from bumping against the in-vehicle lateral surface or from being thrown out of an open window.

The airbag 1 includes two panels of substantially the same shape, one facing the in-vehicle lateral surface or vehicle body and the other facing the vehicle cabin. The panel adjacent to the vehicle body is a first panel 11, and the panel adjacent to the occupants or cabin is a second panel 12. The airbag 1 further includes an air-permeable panel 10 between the first panel 11 and the second panel 12. The panels 10, 11, and 12 are joined together at linear connected portions 13, 50, and 51 to thereby form two chambers, a primary chamber and a secondary chamber. The panels 10 and 11 are tied together at linear connected portions 14, 15, 16, and 17 and circular connected portions 40, 41, 42, 43, and 44. In this manner, a gas inlet 20; cushion cells 21, 22, 23, 24, 25, 26, 27, 28, and 29 (primary chamber cell group); and a cushion chamber 58 (secondary chamber) are formed. The air-permeable panel 10 also has substantially the same shape as the panels 11 and 12.

The linear connected portion 13 extends around the peripheries of the panels 10, 11, and 12. Both ends 13e of the linear connected portion 13 extend substantially in parallel to each other in the middles of the upper sides of the panels 10, 11, and 12 to form the gas inlet 20 between the panels 10 and 11. The cushion cell 21 longitudinally extends between the panels 10 and 11 along the upper side of the linear connected portion 13, and the cushion cell 24 longitudinally extends between the panels 10 and 11 along the lower side of the linear connected portion 13. The front part (left part in FIG. 1) of the linear connected portion 13 extends in a substantially C-shape to form the cushion cell 23 between the panels 10 and 11.

The linear connected portion 14 extends in a larger U-shape in the front half of the airbag 1, whereas the linear connected portion 15 extends in a smaller U-shape inside the linear connected portion 14.

The linear connected portion 16 extends in a substantially rectangular shape in the middle in the longitudinal direction of the airbag 1. The linear connected portion 17 extends in a substantially J-shape in the rear part of the airbag 1. The lower end (rear end) of the linear connected portion 17 connects to the linear connected portion 13. The panels 10 and 11 are joined together at these linear connected portions 14, 15, 16, and 17.

The upper ends of the linear connected portions 14, 15, and 17 connect to the reinforcing circular connected portions 40, 41, 42, 43, and 44. At these circular connected portions 40, 41, 42, 43, and 44, the panels 10, 11, and 12 may be joined together or the panels 10 and 11 only may be joined together. The circular connected portions 40, 41, 42, 43, and 44 and the upper side of the linear connected portion 16 are disposed below the upper side of the linear connected portion 13 by a predetermined distance to form the cushion cell 21 between the panels 10 and 11. In other words, the cushion cell 21 is surrounded by the circular connected portions 40, 41, 42, 43, and 44; the upper side of the linear connected portion 16; the upper side portion of the linear connected portion 13; the panel 10; and the panel 11.

The cushion cells 22, 25, 26, 27, 28, and 29 are defined by the panels 10 and 11 so as to merge with the cushion cell 21 formed thereabove. The cushion cell 22 is formed between the front end portion of the linear, connected portion 14 and the front part of the linear connected portion 13, the cushion cell 25 is formed between the linear connected portions 14 and 15, and the cushion cell 26 is formed inside the linear connected portion 15. The cushion cell 27 is formed between the rear part of the linear connected portion 14 and the front part of the linear connected portion 16. The cushion cell 28 is formed between the rear part of the linear connected portion 16 and the linear connected portion 17. The cushion cell 29 is formed between the linear connected portion 17 and the rear part of the linear connected portion 13.

The cushion cell 24 is defined by the panels 10 and 11, and is formed below the linear connected portions 14, 16, and 17 but above the lower side portion of the linear connected portion 13. The cushion cell 24 merges with the cushion cells 22, 27, 28, and 23.

The secondary chamber 58 is defined by the second panel 12 (cushion chamber) and the air-permeable panel 10.

The panels 10, 11, and 12 are joined together at the linear connected portions 50 in the front periphery and the upper periphery of the airbag 1. The major parts of the linear connected portions 50 extend in parallel to the peripheral edges of the panels 10, 11, and 12. Some parts of the linear connected portions 50 extend substantially perpendicular to the peripheral edges to form the linear connected portions 51 connecting to the peripheral edges of the panels 10, 11, and 12. Between each pair of parallel linear connected portions 51 is provided an insertion hole 52 for fittings such as bolts and rivets. The airbag 1 is secured to the vehicle body with bolts through these insertion holes 52.

The airbag 1 is disposed such that its front end is adjacent to the A pillar, its rear end is adjacent to the C pillar, and its upper side is adjacent to the lateral edge of the roof. The airbag 1 is disposed in a folded state inside a holder (not shown) for the airbag 1 on the vehicle body, so as to extend in an elongated manner along the longitudinal direction of the vehicle. The gas inlet 20 is connected to a gas tube or a gas generator.

The airbag 1 folded in the holder on the vehicle body is covered with a covering such as a pillar trim piece or a roof trim piece. This covering is forced open by the inflating airbag 1 to allow the airbag 1 to expand into the vehicle cabin.

The operation of a head-protecting airbag device including the above-described airbag 1 will now be described.

In the event of a side impact or rollover of a vehicle, the gas generator is activated to supply gas into the cushion cells 21, 22, 23, 24, 25, 26, 27, 28, and 29 (primary chamber cell group), thus inflating the airbag 1. The inflating airbag 1 forcibly pushes the covering open and expands downward like a curtain over the in-vehicle lateral surface between the vehicle occupants and the in-vehicle lateral surface. In this case, the cushion cells 21, 22, 23, 24, 25, 26, 27, 28, and 29 (primary chamber cell group) between the panels 10 and 11 are inflated and then the secondary chamber 58 between the panels 10 and 12 is inflated by gas which has passed through the air-permeable panel 10. Consequently, the airbag 1 prevents the occupants from bumping directly against the pillars or the window glass or from being thrown out of an open window.

According to the head-protecting airbag 1, the air permeability of the air-permeable panel 10 can be properly determined so that when the internal pressure of the inflated cushion cells 21, 22, 23, 24, 25, 26, 27, 28, and 29 (primary chamber cell group) reaches a predetermined value as a result of the load of the head H of an occupant as shown in FIG. 3, gas in the primary chamber (the cushion cell 29 in FIG. 3) starts to flow into the secondary chamber 58. Thus, the impact of the head of the occupant can be absorbed satisfactorily.

In the airbag 1 described above, gas flows from the primary chamber cell group into the secondary chamber 58 through the air-permeable panel 10. Such gas, however, does not leak out of the airbag 1. Therefore, the internal pressure of the cushion cells 21, 22, 23, 24, 25, 26, 27, 28, and 29 is maintained at an appropriate level for a long time, thus allowing the airbag 1 to function as a head protector of the occupants for an extended period of time.

While the airbag 1 shown in FIGS. 1 to 3 has the secondary chamber 58 adjacent to the occupant, the secondary chamber 58 may be adjacent to the vehicle body as with a head-protecting airbag 1' shown in FIG. 4. FIG. 4(a) is a sectional view corresponding to FIG. 2(a) showing the inflated airbag 1, and FIG. 4(b) is a sectional view corresponding to FIG. 3 showing the airbag 1 receiving the head H of an occupant.

The airbag 1' also includes the first panel 11 adjacent to the vehicle body, the second panel 12 adjacent to the occupants, and the air-permeable panel 10 between the first panel 11 and the second panel 12. The panels 10, 11, and 12 are joined together at the linear connected portions 13, 50, and 51. The panels 10 and 12 are joined together at the linear connected portions 14, 15, 16, and 17 and the circular connected portions 40, 41, 42, 43, and 44. In this manner, the gas inlet 20; the cushion cells 21, 22, 23, 24, 25, 26, 27, 28, and 29 (primary chamber cell group) adjacent to the occupants; and the cushion chamber (secondary chamber) 58 adjacent to the vehicle body are formed. FIG. 4 shows only the panels 10, 11, and 12; the linear connected portions 13 and 17; and the cushion cells 28, 29, and 58. However, the panels 10, 11, and 12 are joined together at the linear connected portions 13, 14, 15, 16, 17, 50, and 51 and the circular connected portions 40, 41, 42, 43, and 44, thus defining the cushion cells 21, 22, 23, 24, 25, 26, 27, 28, 29 and the cushion chamber 58 in the same manner as with the airbag 1 shown in FIGS. 1 to 3. The cushion cells 21, 22, 23, 24, 25, 26, 27, 28, and 29 of the airbag 1' are arranged as shown in FIGS. 1 to 3, but are defined between the panels 10 and 12 instead of between 10 and 11. The other components of the airbag 1' are also as shown in FIGS. 1 to 3.

According to a head-protecting airbag device including the above-described airbag 1', in the event of a side-on collision or roll-over of a vehicle, the gas generator is activated to supply gas into the cushion cells 21, 22, 23, 24, 25, 26, 27, 28, and 29 (primary chamber cell group) of the airbag 1', thus inflating the airbag 1'. The inflating airbag 1' forcibly pushes the covering open and expands downward like a curtain over the in-vehicle lateral surface between the vehicle occupants and the in-vehicle lateral surface, as shown in FIG. 4(b). In this case, the cushion cells 21, 22, 23, 24, 25, 26, 27, 28, and 29 (primary chamber cell group) between the panels 10 and 12 are inflated and then the secondary chamber 58 between the panels 10 and 11 is inflated by gas which has passed through the air-permeable panel 10. Consequently, the airbag 1' prevents the occupants from bumping directly against the pillars or the window glass or from being thrown out of an open window.

According to the head-protecting airbag 1', the inflated cushion cells 21, 22, 23, 24, 25, 26, 27, 28, and 29 (primary chamber cell group) directly receive the head H of an occupant, as shown in FIG. 4(b). The air permeability of the air-permeable panel 10 can be properly determined so that when the internal pressure of the cushion cells 21, 22, 23, 24, 25, 26, 27, 28, and 29 (primary chamber cell group) reaches a predetermined value as a result of the load of the head, gas in the primary chamber (the cushion cell 29 in FIG. 4(b)) starts to flow into the secondary chamber 58. Thus, the impact of the head of the occupant can be absorbed satisfactorily.

In the airbag 1' described above, gas flows from the primary chamber cell group into the secondary chamber 58 through the air-permeable panel 10. Such gas, however, does not leak out of the airbag 1'. Therefore, the internal pressure of the cushion cells 21, 22, 23, 24, 25, 26, 27, 28, and 29 is maintained at an appropriate level for a long time, thus allowing the airbag 1' to function as a head protector of the occupants for an extended period of time.

FIG. 5 is a sectional view of a head-protecting airbag according to still another embodiment.

According to this embodiment, a first panel 61 and a second panel 62 are joined together at a linear connected portion 70 to form an airbag 1A. The airbag 1A has therein an air-permeable panel 60 joined to the panels 61 and 62 at linear connected portions 71. The airbag 1A further includes a primary chamber 63 and a secondary chamber 64 separated from each other by the air-permeable panel 60.

According to the head-protecting airbag 1A in FIG. 5, the internal pressure of the primary chamber 63 increases if an occupant's head bumps against the primary chamber 63, causing the gas to flow into the secondary chamber 64 through the air-permeable panel 60. Thus, the impact of the head of the occupant can be absorbed satisfactorily. As with the airbag 1 according to the first embodiment, gas does not leak out of the airbag 1A, and therefore the internal pressure of the airbag 1A is maintained at an appropriate level for a long time.

In FIG. 5, the two chambers, i.e., the upper chamber 63 and the lower chamber 64 are defined by one air-permeable panel 60; however, air-permeable panels may be used to define three or more chambers arranged vertically.

The present invention is typically described with reference to, but not limited to, the airbags according to the foregoing embodiments. For example, the size or shape of the airbags is hot limited to those shown in the drawings.

As described above, the present invention provides a head-protecting airbag and a head-protecting airbag device that exhibit a gentle change in internal pressure of chambers and facilitate the adjustment of the internal pressure of a primary chamber.

The priority documents, Japanese Patent Application No. 2002-366958, filed Dec. 18, 2002, and Japanese Patent Application No. 2003-333345, filed Sep. 25, 2003, are hereby incorporated by reference.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A head-protecting airbag comprising:
   a primary chamber; and
   a secondary chamber;
   wherein the primary chamber is separated from the secondary chamber by a separation panel,
   wherein the separation panel includes a first surface area exposed to the primary chamber and a second surface area exposed to the secondary chamber, wherein the separation panel permits to enter the entire first surface area from the primary chamber and to flow through the entire second surface area into the secondary chamber, and wherein at least one of the primary chamber and the secondary chamber comprises a first panel, wherein the separation panel has substantially the same shape as the first panel.

2. The head-protecting airbag according to claim 1, wherein the head-protecting airbag is inflatable over an in-vehicle lateral surface.

3. The head-protecting airbag according to claim 1, wherein the primary chamber is inflated by gas discharged from a gas generator.

4. The head-protecting airbag according to claim 1, wherein the secondary chamber is inflated by gas transferred from the primary chamber.

5. The head-protecting airbag according to claim 1, wherein the secondary chamber is inflated by gas passing through the separation panel.

6. The head-protecting airbag according to claim 1, further comprising:
 a second panel;
 wherein the separation panel is disposed between the first panel and the second panel.

7. The head-protecting airbag according to claim 6, wherein the primary chamber is defined by the first panel and the separation panel.

8. The head-protecting airbag according to claim 7, wherein the primary chamber includes a pair of cells formed by a connection between the separation panel and the first panel.

9. The head-protecting airbag according to claim 6, wherein the secondary chamber is defined by the second panel and the separation panel.

10. The head-protecting airbag according to claim 6, wherein the primary chamber is defined by the first panel and the separation panel and the secondary chamber is defined by the second panel and the separation panel;
 wherein the separation panel includes a periphery portion and an interior portion; and
 wherein a portion of the interior portion of the separation panel is connected to the first panel to thereby form a pair of cells.

11. The head-protecting airbag according to claim 1, wherein the first panel is adjacent to a vehicle body and a second panel is adjacent to a vehicle cabin.

12. The head-protecting airbag according to claim 11, wherein the separation panel is connected to the first panel and the second panel to thereby form the primary chamber and the secondary chamber.

13. A head-protecting airbag device comprising:
 an airbag, wherein the airbag includes a primary chamber, a secondary chamber, and a separation panel separating the primary chamber and the secondary chamber; and
 a gas generating apparatus configured to generate gas to inflate the airbag,
 wherein the separation panel includes a first surface area exposed to the primary chamber and a second surface area exposed to the secondary chamber,
 wherein the separation panel permits air to enter the entire first surface area from the primary chamber and to flow through the entire second surface area into the secondary chamber, and
 wherein at least one of the primary chamber and the secondary chamber comprises a first panel, wherein the separation panel has substantially the same shape as the first panel.

14. An airbag for a vehicle comprising:
 a cabin side panel;
 a body side panel; and
 a separation panel positioned between the cabin side panel and the body side panel to thereby form a primary chamber bounded by the body side panel and the separation panel and a secondary chamber bounded by the cabin side panel and the separation panel,
 wherein the separation panel includes a first surface area exposed to the primary chamber and a second surface area exposed to the secondary chamber,
 wherein the separation panel permits air to enter the entire first surface area from the primary chamber and to flow through the entire second surface area into the secondary chamber, and
 wherein the separation panel has substantially the same shape as at least one of the cabin side panel and the body side panel.

15. The airbag for a vehicle of claim 14, wherein the primary chamber includes a pair of cells separated by a connection between the separation panel and the body side panel.

16. An airbag for a vehicle comprising:
 a cabin side panel;
 a body side panel; and
 an air permeable panel positioned between the cabin side panel and the body side panel to thereby form a primary chamber bounded by the cabin side panel and the air permeable panel and a secondary chamber bounded by the body side panel and the air permeable panel;
 wherein the primary chamber includes a pair of cells separated by a connection between the air permeable panel and the cabin side panel; and
 wherein the primary chamber is inflated by gas discharged from a gas generator, and the secondary chamber is inflated by gas transferred from the primary chamber.

* * * * *